W. BÉCOTTE.
ANTISKIDDING DEVICE.
APPLICATION FILED JULY 18, 1917.
1,278,832. Patented Sept. 17, 1918.
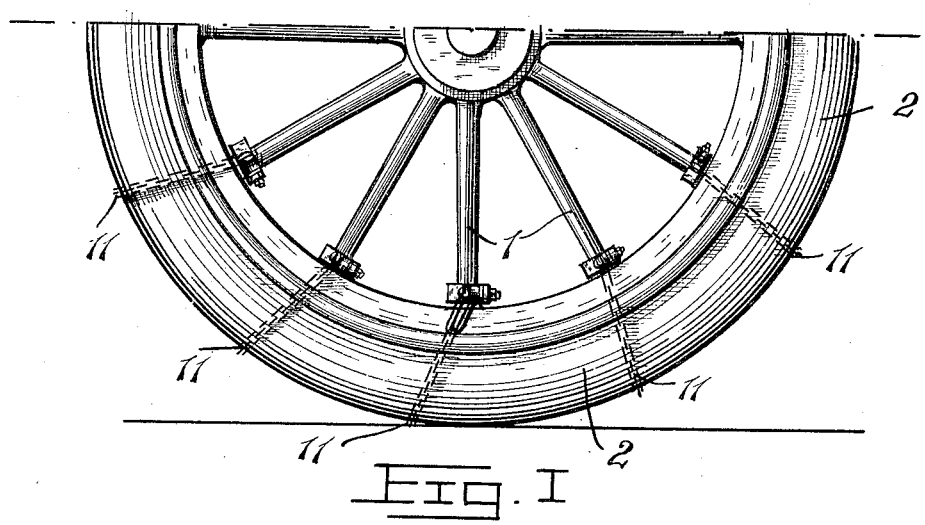
Fig. 1
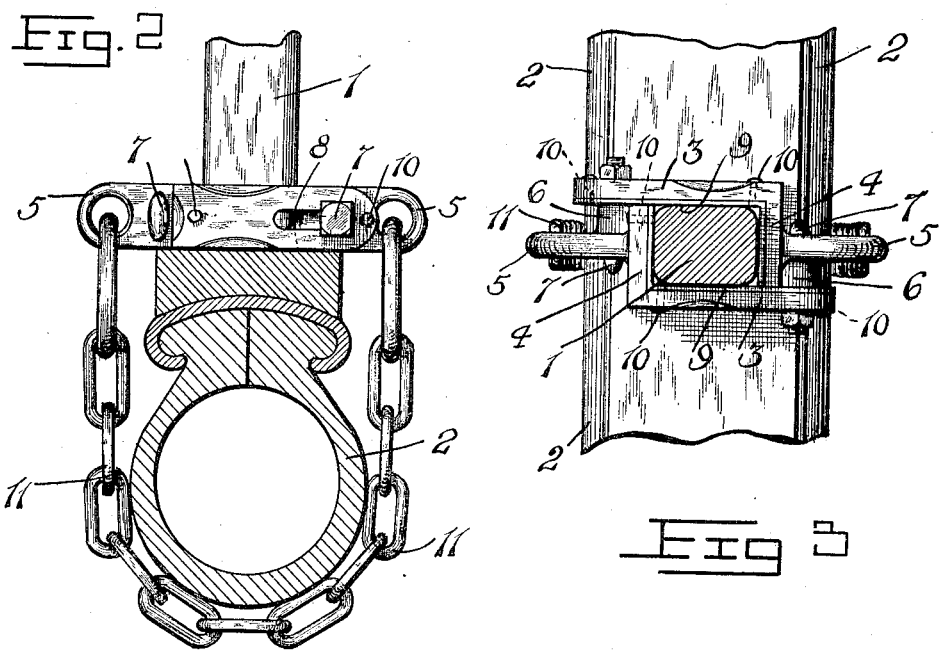
Fig. 2
Fig. 3
Inventor
W. Bécotte

UNITED STATES PATENT OFFICE.

WILLIAM BÉCOTTE, OF NEW BEDFORD, MASSACHUSETTS, ASSIGNOR TO ARMAND BÉCOTTE, OF NEW BEDFORD, MASSACHUSETTS.

ANTISKIDDING DEVICE.

1,278,832.  Specification of Letters Patent.  Patented Sept. 17, 1918.

Application filed July 18, 1917. Serial No. 181,272.

*To all whom it may concern:*

Be it known that I, WILLIAM BÉCOTTE, a subject of the King of Great Britain, residing at New Bedford, in the county of Bristol and State of Massachusetts, United States of America, have invented certain new and useful Improvements in Antiskidding Devices; and I do hereby declare that the following is a full, clear, and exact description of the invention, such as will enable others skilled in the art to which it appertains to make and use the same.

The present invention relates to an antiskidding device for vehicle wheels and more particularly to a clamp for securing chains or similar anti-skidding members to the wheels of automobiles so that the wheels will be prevented from slipping.

An object of the present invention is to provide a device of the character aforesaid whereby the chains may be easily and readily applied to the vehicle wheels or removed when desired and which will securely hold the chains in their proper places upon the tires of the wheels.

With the above and other objects in view which will hereinafter appear as the description continues, the invention consists of the novel features of construction, combination and formation of parts as will be hereinafter more fully described and particularly pointed out in the appended claims.

In the accompanying drawings has been shown the simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

Figure 1 is a fragmental side elevation of a vehicle wheel having the invention applied thereto;

Fig. 2 is a detail vertical section through the wheel; and,

Fig. 3 is a detail section showing the invention in plan view.

Referring now more particularly to the accompanying drawings wherein like and corresponding parts are designated by similar reference characters throughout the several views.

The numeral 1 indicates the spokes of an ordinary vehicle wheel having a tire 2 connected to the felly of the wheel in the usual manner. Whereas I have shown a pneumatic tire, it is of course to be understood that the invention may be applied to vehicle tires which are made of solid rubber and which are used on large automobile trucks. To prevent the wheels from skidding or slipping, it has been heretofore customary to encircle the tire of the vehicle wheel with a chain or chains forming a gripping means so that the tire will engage the ground and prevent the wheel from slipping. The present invention resides more particularly in a clamp for connecting such chains to the vehicle wheel whereby the chains will be prevented from slipping, or being severed from the wheel due to the great strains exerted thereupon. In Fig. 1 of the drawings I have illustrated a vehicle wheel having a number of these chains secured thereto, but, of course, it is to be understood that one or more chains may be used as is desired.

The clamp as herein shown comprises two sections. Each of these sections consists of a long arm and a short arm and these arms are arranged at right angles to each other. The shorter arms have each formed therewith an apertured lug 5 and extending laterally from each apertured lug is a bearing 6 and these bearings are for the reception of the bolts 7. The longer arms of the sections are provided with elongated slots 8 and the shank portions of these bolts 7 also project through these slots 8, thereby providing an adjustable connection between the sections of the clamp. The inner faces of the arms of each section are lined with a leather strip 9, which strips are retained in position by means of the rivets 10. The sections of this clamp are to fit around the spokes 1 of the wheel and the clamp is to rest upon the inner periphery of the felly of the wheel. The sections of the clamp when in proper position may be forced together as better shown in Fig. 3 of the drawings, where they will be gripped to the spokes of the wheel by tightening the nuts carried by the bolts 7 and the leather lining 9 will act as a means for protecting the spokes of the wheel and at the same time provide a frictional face which will prevent the sections from slipping with relation to each other when the nuts carried on the bolts 7 are tightened. The usual chain 11 encircles the tire as shown in Fig. 2 and the extremities of this chain are secured to the apertured lugs 5.

From the foregoing it is obvious that in placing the chain upon the wheel the sections of the clamp may be separated so that they may be placed around the spokes of the wheel and tightened in place, thereby eliminating the necessity of disconnecting the chain from the clamp and when the clamps are so retained in place they will securely hold the chain in its proper position upon the wheel.

Having thus fully described my invention, what I claim as new and desire to secure by Letters Patent is:

A clamp for anti-skidding devices of the character described comprising two sections, each of said sections comprising a long arm and a short arm arranged at right angles to each other, an apertured lug formed with each of said arms, a bearing formed with and extending laterally from each of said lugs, bolts extending through said lugs and bearings, the longer arms having each an apertured slot therein and said bolts adapted to extend through said elongated slots whereby the sections may be adjustably connected substantially as and for the purpose specified.

In witness whereof I have hereunto set my hand.

WILLIAM BÉCOTTE.

Witnesses:
ALDÈGE CHAUSSÉ,
WILFRED FUNETH.

Copies of this patent may be obtained for five cents each, by addressing the "Commissioner of Patents, Washington, D. C."